(12) United States Patent
de Buda

(10) Patent No.: US 6,751,711 B1
(45) Date of Patent: Jun. 15, 2004

(54) METHODS AND SYSTEMS FOR PROCESS ROLLBACK IN A SHARED MEMORY PARALLEL PROCESSOR COMPUTING ENVIRONMENT

(75) Inventor: Ingrid G. de Buda, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 602 days.

(21) Appl. No.: 09/696,957

(22) Filed: Oct. 27, 2000

(51) Int. Cl.[7] .............................................. G06F 12/06
(52) U.S. Cl. ...................... 711/151; 711/168; 711/170; 710/244; 709/103
(58) Field of Search ................................ 711/151, 158, 711/168, 150, 170; 709/102, 103; 710/244, 40

(56) References Cited

U.S. PATENT DOCUMENTS

| | | | |
|---|---|---|---|
| 4,794,526 A | * 12/1988 | May et al. ................... | 709/103 |
| 5,506,987 A | * 4/1996 | Abramson et al. .......... | 709/103 |
| 5,634,060 A | * 5/1997 | Jennings ..................... | 710/241 |
| 5,918,248 A | 6/1999 | Newell et al. .............. | 711/147 |
| 6,397,352 B1 | * 5/2002 | Chandrasekaran et al. .... | 714/16 |
| 6,516,393 B1 | * 2/2003 | Fee et al. ................... | 711/150 |
| 6,591,264 B1 | * 7/2003 | Humlicek ...................... | 707/8 |

OTHER PUBLICATIONS

"A Highly Configurable And Adaptable Process Scheduler", IBM Technical Disclosure Bulletin, page(s) 630, issue 444, Apr. 2001.*

* cited by examiner

Primary Examiner—Pierre-Michel Bataille
(74) Attorney, Agent, or Firm—Max R. Wood; Ogilvy Renault (57) ABSTRACT

Methods and systems for process rollback in a shared memory parallel processor computing environment use priority values to control process rollback. Process classes are defined and each process class is allocated a base priority value. Each process run by the system is associated with one of the classes. In accordance with a first embodiment, process priorities determine which process is rolled back. In accordance with a second embodiment, collision counts and class pair priorities determine which process is rolled back. The methods and systems ensure that critical processes are granted at least a minimum allocation of processor time, while less critical processes are not completely starved. The functionality the system is thereby improved.

37 Claims, 7 Drawing Sheets

METHODS AND SYSTEMS FOR PROCESS ROLLBACK IN A SHARED MEMORY PARALLEL PROCESSOR COMPUTING ENVIRONMENT

CROSS-REFERENCE TO RELATED APPLICATIONS

This is the first application filed for the present invention.

MICROFICHE APPENDIX

Not applicable.

TECHNICAL FIELD

This invention relates in general to shared memory systems for use in parallel processing environments and, in particular to methods and systems for process rollback in a shared memory parallel processor environment.

BACKGROUND OF THE INVENTION

The rapid growth in the Public Switched Telephone Network (PSTN), especially the rapid expansion of service features has strained the processing capacity of incumbent switching equipment. This is particularly the case in wireless telephony environments where messaging loads between mobile switching centres are intense. As is well known, most incumbent switching systems in the PSTN have processing architectures that are based on a single central control component that is responsible for all top level processing in the system. Such single central control component architectures provide the advantage to application programmers of some simplification with respect to resource control, flow control and inter-process communication. However, single central control component architectures are subject to serious bottlenecks due principally to the fact that each process is dependent on the capacity of the single core processor. There has therefore been an acute interest in developing parallel processor control for incumbent switching systems to improve performance and permit the addition of new processor-intensive service features.

Parallel processor architectures are well known. However, the software written for such architectures is specifically designed to avoid processor conflicts while accessing shared resources such as shared memory. This is accomplished by providing exclusive access to the memories using software semaphores or methods for locking memory access buses, and the like. However, incumbent switching systems in the PSTN were typically written for a central control component, and in many cases it is not economically feasible to rewrite the application code for a parallel processor architecture. Aside from the complexity of such a rewrite, the time and cost incurred to complete such a task is generally considered to be prohibitive.

It is known in the art that when a shared memory parallel processor computing environment is used to execute code written for a single central control component, two processes can compete for a memory space in the shared memory. This competition is called blocking. Because rights to a memory space cannot be granted to more than one process at a time, one process must be "rolled back" while the other process is permitted to continue execution.

A shared memory control algorithm for mutual exclusion and rollback is described in U.S. Pat. No. 5,918,248, which issued on Jun. 29, 1999 to the Assignee. The patent describes a mechanism for permitting a shared memory single central control component parallel processing architecture to be used in place of a conventional system, without requiring code written for the conventional system to be rewritten. Exclusive Access and Shared Lead Access implementations are disclosed. A rollback mechanism is provided which permits all the actions of a task in progress to be undone. The memory locations of that parallel processor architecture include standard locations and shared read locations. Any task is granted read access to a shared read location, but only a single task is granted write access to a shared read location at any given time.

A prior art rollback mechanism designed by the Assignee uses three priority levels (0, 1 and 2). When two processes compete for the same memory space, the process with the higher priority is permitted to continue execution and the process with the lower priority is rolled back. Initially, each process is assigned a default priority value of zero. When two processes having zero priority compete for a same memory space, the processes are executed on a first-in-first-out basis. The process that is rolled back then has its priority set at 1. If the same process is rolled back a second time, due to competition with another priority 1 process, the priority of the process is set at 2, which is the highest priority permitted. The scheduler ensures that only one priority 2 process is allowed to execute on the system at any one time. After the process has reached a commit point, the priority associated with the process is reset to zero.

While this algorithm represents a significant advance in the art, the rollback mechanism has not proven to support optimal performance. Performance is compromised for the principal reason that processes belonging to large classes are rolled back too often to meet their CPU time requirement.

It is therefore highly desirable to provide a method and system for rolling back processes in a shared memory, parallel processor computing environment that enhances performance by ensuring that access to computing resources is optimized.

SUMMARY OF THE INVENTION

It is therefore an object of the invention to provide methods and systems for process rollback in a shared memory, parallel processor computing environment that enhances performance by ensuring that processes are rolled back in proportion to their allotted processing time.

In accordance with a first embodiment of the invention, there is provided a method for process rollback in a shared-memory parallel-processor computing environment in which the parallel processors are operated concurrently and each processor sequentially runs processes. In accordance with the method, when two processes compete for a memory space in the shared memory, one of the processes is rolled back. The process that is rolled back is the process that has a lower priority value, or if the two processes have the same priority value, the process that collided with an owner of the memory space is rolled back. A process collides with the owner of the memory space if it attempts to access the memory space when the owner has possession of the memory space.

When a process is rolled back, a new priority value is computed for the rolled-back process. The new priority value is computed for the rolled-back process by incrementing the processes priority value by a predetermined amount. If the two processes are members of different classes, the predetermined amount is preferably a priority value assigned to a class of which the rolled-back process is a member. If the two processes are members of the same class, the predetermined amount is preferably less than the priority value assigned to the class. When a process reaches a commit point, the priority value of the process is reset to a priority value assigned to the class of which the process is a member.

The priority value assigned to the class is preferably related to a proportion of processor time allocated to the class. The priority value may be directly proportional to the processor time allocated to the class, for example. In accordance with the first embodiment of the invention, the priority value of each process is stored in a process control block associated with the process.

The invention also provides a shared memory parallel processor system for executing processes concurrently, comprising means for storing a priority value associated with each process; means for determining which one of two processes is to be rolled back using the priority values associated with each of the two processes when the two processes compete for a memory space; and, means for computing a new priority value for the process that is rolled back.

The means for determining which process is to be rolled back, comprises means for selecting the process that has a lower priority value, when the two processes have different priority values; and, means for selecting the process that collided with an owner of the memory space, when the two processes have the same priority value. When a collision occurs because two processes compete for a memory space, the system determines a class of which each process is a member. The system further comprises means for computing a new priority value for the rolled-back process, by incrementing the priority value by a predetermined amount. The predetermined amount is a first amount if the processes belong to different classes, and a second amount if the processes belong to the same class. The first amount is preferably a priority value associated with a process class of which the process is a member.

In accordance with a second embodiment of the invention, there is provided a method for process rollback in a shared memory parallel processor computing environment in which the processors run processes concurrently, and each process is a member of one of a plurality of process classes. The method comprises steps of maintaining a pair of variables for each pair of process classes, the variables storing a current priority value for each process class in each process class pair. When two processes that are members of different process classes compete for a same memory space, a collision count stored in a respective process control block of each process is examined to determine whether either collision count exceeds a first engineered collision threshold. If either collision count exceeds the first collision threshold, the process with the lowest collision count is rolled back and the other process is permitted to continue execution. If neither collision count exceeds the threshold, current priority values of the respective class pair are used to determine which process is rolled back. The current priority values are compared and the process that is rolled back is one of: a) the process that is a member of the class that has a lower current priority value; and, b) if the two classes have the same current priority value, the process that collided with an owner of the memory space.

When a process is rolled back a new priority value is stored in the variable for the class priority of which the rolled-back process was a member. A new priority value is stored in the variable by incrementing the variable by an amount equal to a base priority value stored in a process class parameter file.

The collision count for each process is stored in a process control block associated with each of the respective processes. The collision count associated with the rolled-back process is incremented each time the process is rolled back. When a collision count associated with a process exceeds an engineered second collision threshold, the process is run without competition until it commits, and the collision count is reset to zero.

When two processes that are members of the same class compete for the same memory space, the process that collided with an owner of the memory space is rolled back and a collision count associated with the rolled-back process is incremented. Each time a process is scheduled to run, a value of the collision count is compared with the second collision threshold, and if the collision count exceeds the second collision threshold, the process is permitted to run without competition. The collision count is reset to zero after the process reaches a commit point.

The invention further provides a shared-memory parallel-processor computing apparatus in which the processors run processes concurrently, and each process is a member of one of a plurality of process classes. The apparatus comprises means for storing a pair of variables for each pair of process classes, the variables storing a variable priority value for each process class in each process class pair. The apparatus further comprises means for determining, using the respective priority values, which process is rolled back when two processes that are members of different process classes compete for a memory space. The system also comprises means for computing and storing a collision count associated with each of the processes. The means for computing and storing the collision count preferably stores the collision count in a process control block associated with each of the respective processes. The means for computing and storing the collision count increments the collision count associated with the rolled-back process when a process is rolled back.

The means for determining which process is rolled back selects one of: the process with the lowest collision count if the collision count associated with either process exceeds a first collision count threshold, and if neither collision count exceeds the first threshold, the process that is a member of the class that has a lower priority value unless the two classes have the same priority value, in which case, the process that collided with an owner of the memory space is rolled back.

The system further comprises means for storing a new priority value in the variable for the class of which the rolled-back process is a member. The means for storing a new priority value in the variable adds, to the value of the variable, an amount equal to a base priority value stored in a process class parameter file.

The invention therefore provides a parallel processor/shared memory computing system that ensures that critical processes are guaranteed adequate processor time, while also ensuring that less critical processes are not completely starved. Process execution is dynamically adjusted to ensure equitability of access to computing resources. A system controlled by the methods in accordance with the invention is therefore ensured of more stable operation, and functionality is improved.

BRIEF DESCRIPTION OF THE DRAWINGS

Preferred embodiments of the invention will now be described with reference to the attached drawings in which.

It will be noted that throughout the appended drawings, like features are identified by like reference numerals.

DETAILED DESCRIPTION OF THE PREFERRED EMBODIMENTS

This invention provides methods and systems for rollback in a parallel processor/shared memory computing environment. In accordance with the invention, a plurality of process classes are respectively allocated a base priority value. Each process run by the processors is associated with one of the classes so that each process inherits an initial priority value from the class of which the process is a member. The initial priority value inherited from the class is a base priority value allocated to the class. The base priority value is stored, for example, in a class parameter file.

Preferably, the base priority value is directly proportional to a processor time share allocation granted to the class of processes.

If two processes compete for a memory space in the common memory while being run, one of the processes is rolled back and the other process is permitted to continue execution. In accordance with the first embodiment of the invention, the process that is rolled back is the process having a lower priority value, or, if the processes have the same priority value, the process that is rolled back is the process that is the "collider". When a process accesses a memory space, it becomes "owner" of the memory space until it has "committed". If a memory space is owned, and another process attempts to access that memory space, the other process is a "collider". When a process is rolled back, the priority value of the process may be incremented to increase the probability that the process will complete next time it is run. The amount by which the priority value is incremented depends upon the circumstances associated with the rollback and the method of rollback control used. The methods and apparatus in accordance with the invention ensure that critical tasks run to completion without starving less critical processes of an opportunity to commit.

Figure 1:
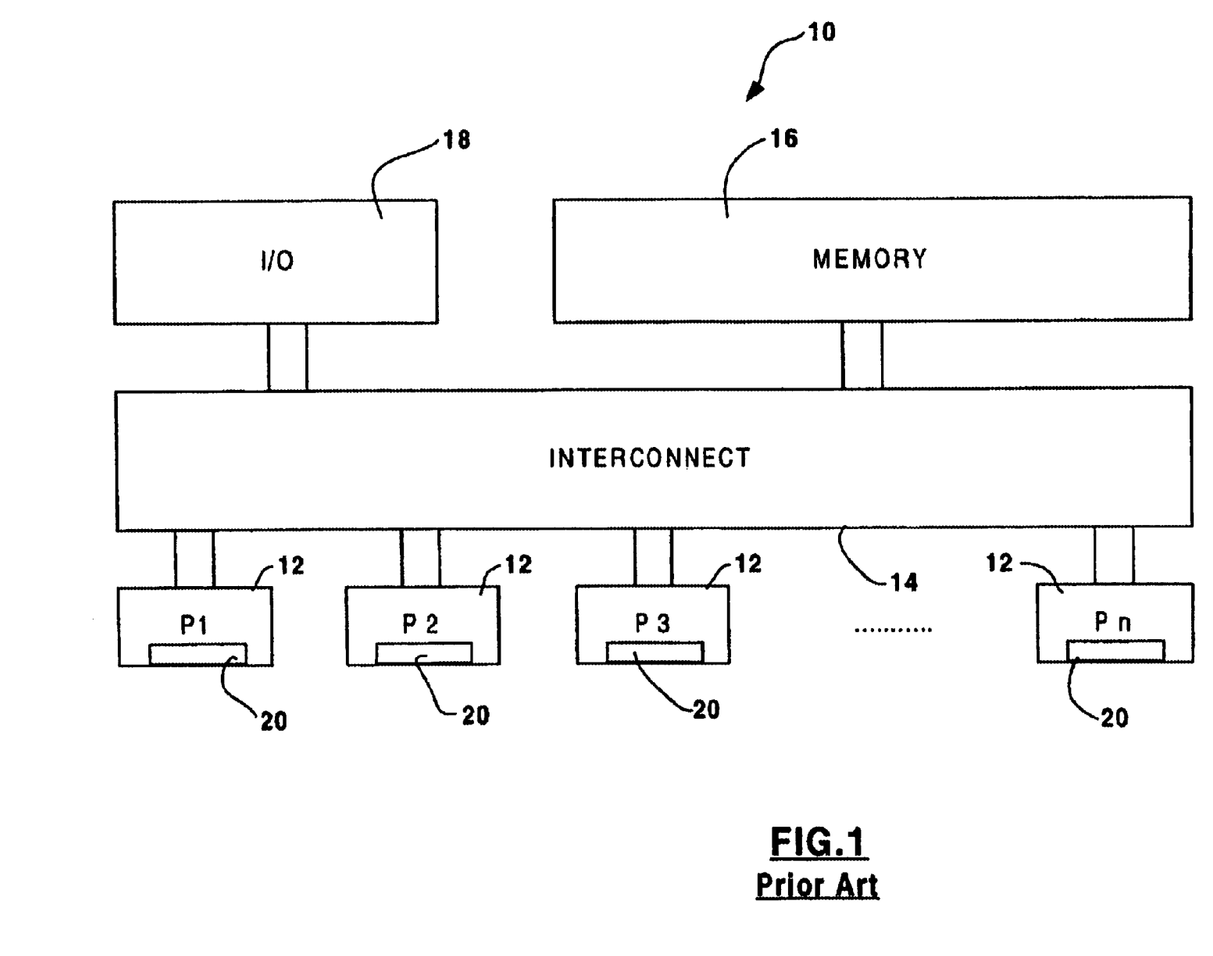
FIG. 1 is a schematic diagram of a parallel processor shared memory system that is known in the art.

FIG. 1 is a schematic diagram of a parallel processor/shared memory system 10, which is well known in the prior art. The system 10 includes a plurality of processors 12 (only four of which are shown) connected through an interconnect 14 to a main shared memory 16 made up of one or more memory modules (only one module is shown), in a manner well known in the art. One or more IO devices 18 are also connected to the interconnect 14. Such systems 10 are commonly equipped with redundant hardware components to increase fault tolerance, but redundancy is not essential to the invention and the redundant elements are not illustrated. Each processor 12 has a respective cache memory 20, that is also well known in the art. Each memory module 16 includes a data memory and memory ownership control functionality, commonly implemented in firmware. For ownership purposes, the data memory in each memory module 16 is divided into segments of memory referred to as "cache lines" or "memory lines", as is well known in the art.

As is well understood in the art and explained in Assignee's U.S. Pat. No. 5,918,248 which issued on Jun. 29, 1999, the specification of which is incorporated herein by reference, special arrangements must be made to ensure that processes running on the system 10 will operate without being affected by other processes running at the same time. In a parallel processor computing environment, two processes running concurrently may compete for a same memory space in the memory modules 16. If this occurs, actions of one process may affect the integrity of data required by actions of the competing process. In order to avoid an unstable state in which data integrity is lost to one of the processes, a mechanism referred to as "rollback" has been adopted. Rollback eliminates the competition by granting exclusive access to the memory to one of the processes, while the other process is rolled back and returned to a process queue, and all operations that the process performed prior to rollback are undone.

Figure 2:
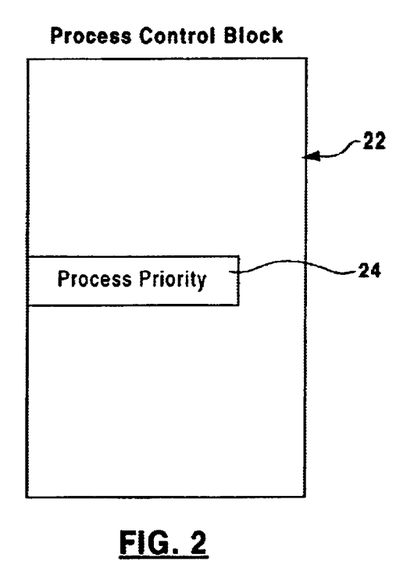
FIG. 2 is a schematic diagram illustrating a process control block in accordance with one embodiment of the invention.

In order to ensure that all processes are granted their fair share of processor time, some mechanism is required for controlling which processes are rolled back. In accordance with a first embodiment of the invention, rollback control is accomplished using a per-process priority tracking and control mechanism. The per-process priority values are tracked using a process control block 22 shown in FIG. 2. As is well known in the art, a process control block is associated with each process that is instantiated by the parallel processing system 10. The process control block 22 stores information required by the system 10 to run and control a process. In accordance with the invention, the process control block includes a process priority field 24 used to store a current priority value for each process run by the shared memory parallel processor system 10.

Figure 3:
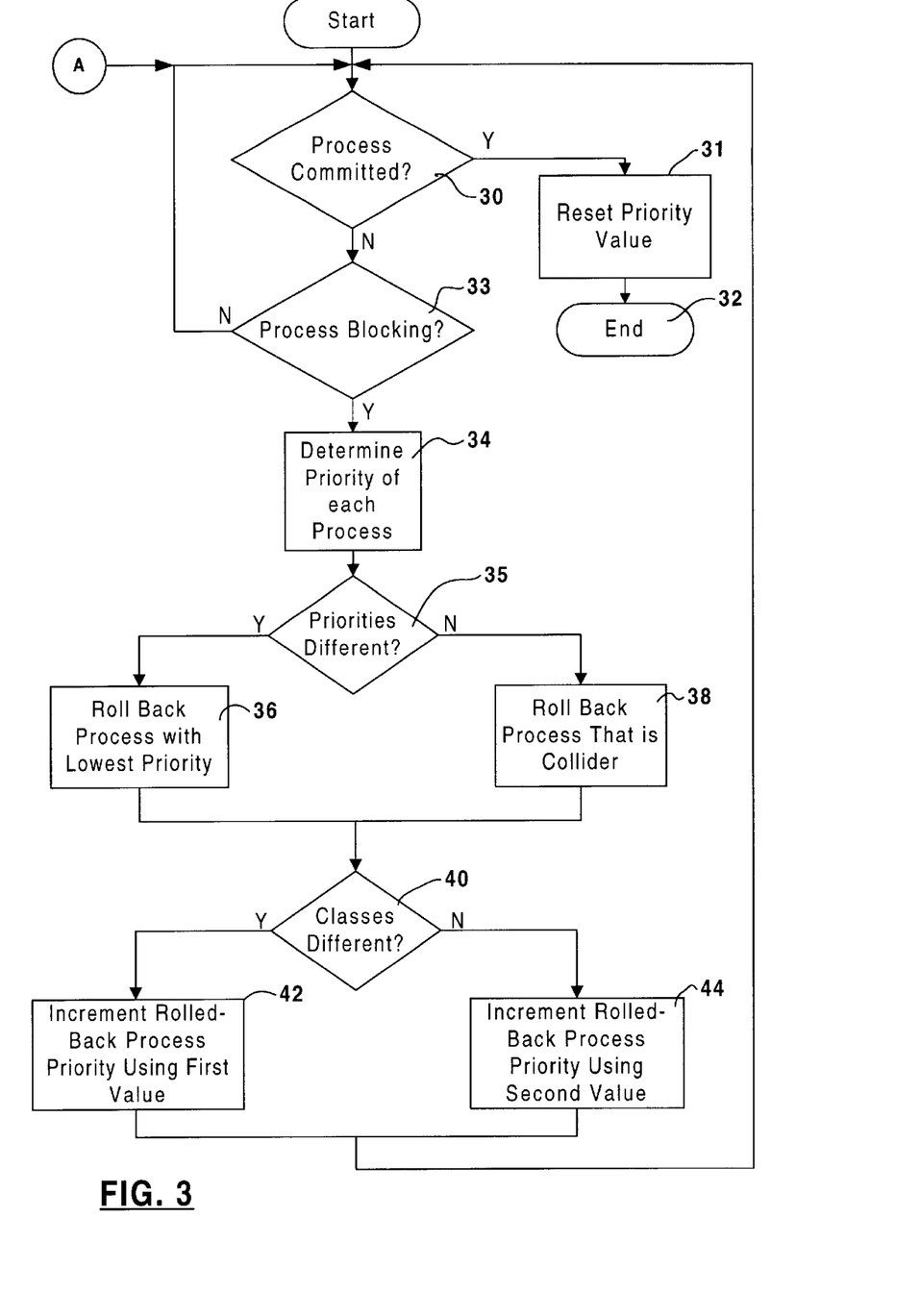
FIG. 3 is a flow diagram illustrating a method of rollback in accordance with a first embodiment of the invention.

FIG. 3 is a flow diagram illustrating rollback control in accordance with the first embodiment of the invention. The system 10 (FIG. 1) continually monitors process execution to determine when an executing process has run to a commit point (step 30). If a process is determined to have run to a commit point, the priority value of the process is reset in step 31, and the process execution ends (step 32). The process priority value is reset to an engineered value (the class base priority value, for example). Thus, each time a process commits, the priority value 24 (FIG. 2) is reset to ensure that the process competes for shared memory space at the engineered priority level next time the process is run.

The system 10 also continuously monitors to determine if a blocking condition (collision) exists (step 33). A blocking condition is detected when hardware sends an interrupt if an identification of a process attempting to access a memory space does not match the identification of the process that currently "owns" the memory space. If a blocking condition exists, the system 10 determines a priority of the owner and the collider processes (step 34). The priorities are compared in step 35. If the priorities are different, the process with the lowest priority is rolled back in step 36. If the priorities are the same, the process that caused the collision (the collider) is rolled back in step 38. After it is determined which process is to be rolled back, the class to which each process belongs is compared in step 40. If the classes are different, the priority value 24 (FIG. 2) of the rolled back process is incremented using a first value. The first value is preferably the base priority value assigned to the class of which the rolled-back process is a member. If it is determined in step 40 that the classes are the same, the priority of the rolled-back process is incremented using a second value, which is preferably significantly less than the first value. After the priority values are incremented in one of steps 42, 44, the process that was rolled back returns to the beginning where the system 10 continues monitoring the process that continues to run, as well as any other processes that are running at the time.

Figure 4:
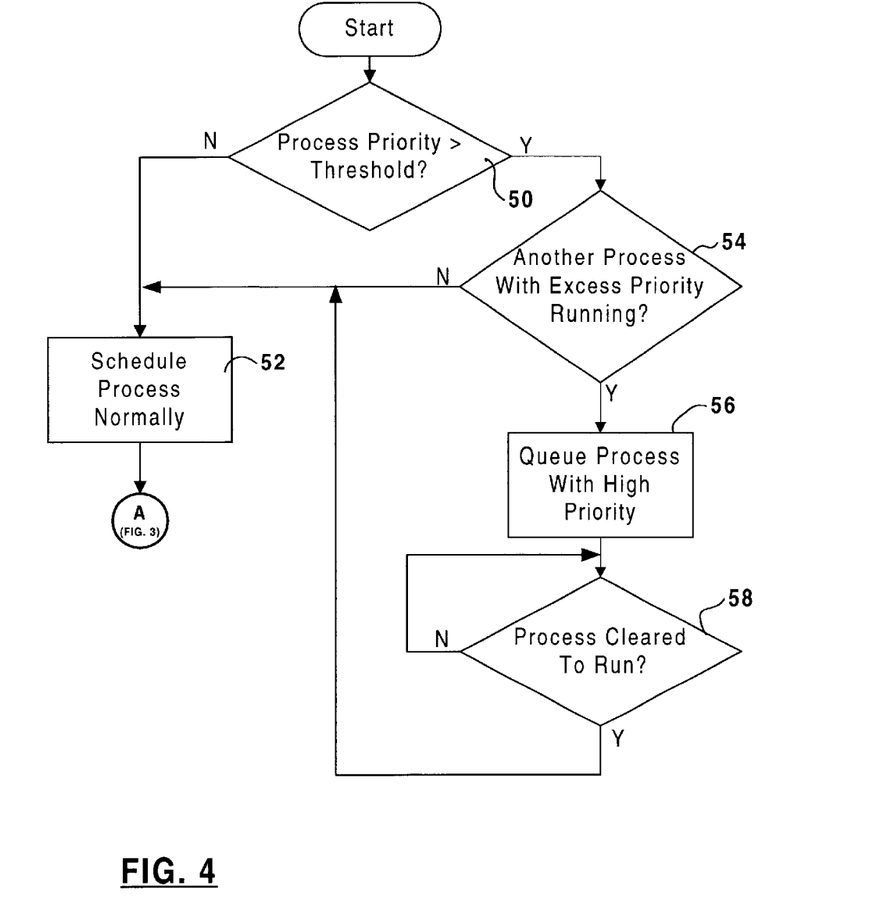
FIG. 4 is a flow diagram illustrating a method in accordance with the first embodiment of the invention for ensuring that processes that are repeatedly rolled back have an opportunity to commit.

FIG. 4 is a flow diagram illustrating a method in accordance with the first embodiment of the invention for ensuring that any particular process is not completely deprived of an opportunity to execute to completion (commit). In accordance with the method, whenever a process is scheduled by a scheduler (not illustrated) of the system 10, the priority value 24 (FIG. 2) in the process control block 22 is examined to determine whether the priority value has exceeded an engineered priority threshold. The engineered priority threshold is preferably a large value, for example, near a maximum expressible value of the priority value field 24. However, the level of the priority threshold is a matter of design choice. If the process priority value is not greater than the engineered priority threshold, the process is scheduled in a normal way (step 52), and control is transferred to the beginning of the process described above with reference to FIG. 3. If, however, it is determined in step 50 that the process priority value is greater than the engineered priority threshold, the priority values of processes currently running, or waiting in a run queue (not shown) to be run, is examined (step 54) to ensure that no other process with a same or a higher priority value is scheduled to run at the same time. This ensures that the process will run to a commit point. If no processes with an excess priority value are running or are queued to run, the process is scheduled to process in the normal way. If there are other potentially colliding processes, the process is queued to run with a high priority in step 56. The run queue and the executing processes are then monitored (step 58) to determine when the process is clear to run, i.e. when there are no other executing or queued processes with the same or higher priority value. When the process is cleared to run, it is scheduled in the normal way in step 52, and control is returned to the process described above with reference to FIG. 3. Thus, every process which, by circumstance, is repeatedly rolled back is guaranteed an opportunity to complete after the processes priority exceeds the engineered priority threshold.

Figure 5:
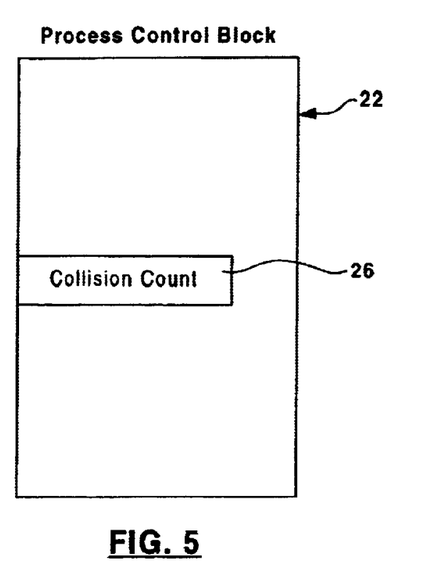
FIG. 5, which appears on sheet two of the drawings, is a schematic diagram illustrating a process control block in accordance with a second embodiment of the invention.

FIG. 5 illustrates a process control block 22 in accordance with a second embodiment of the invention. The process control block 22 stores a collision count 26 rather than the process priority value 24 shown in FIG. 2. The collision count 26 is used to track the number of times that a given process collides with another process and is rolled back. As will be explained below in more detail, the collision count 26 is used in much the same way as the priority value 24 to ensure that every process has an opportunity to complete if, by chance, it is repeatedly rolled back before it is permitted to commit.

Figure 6:
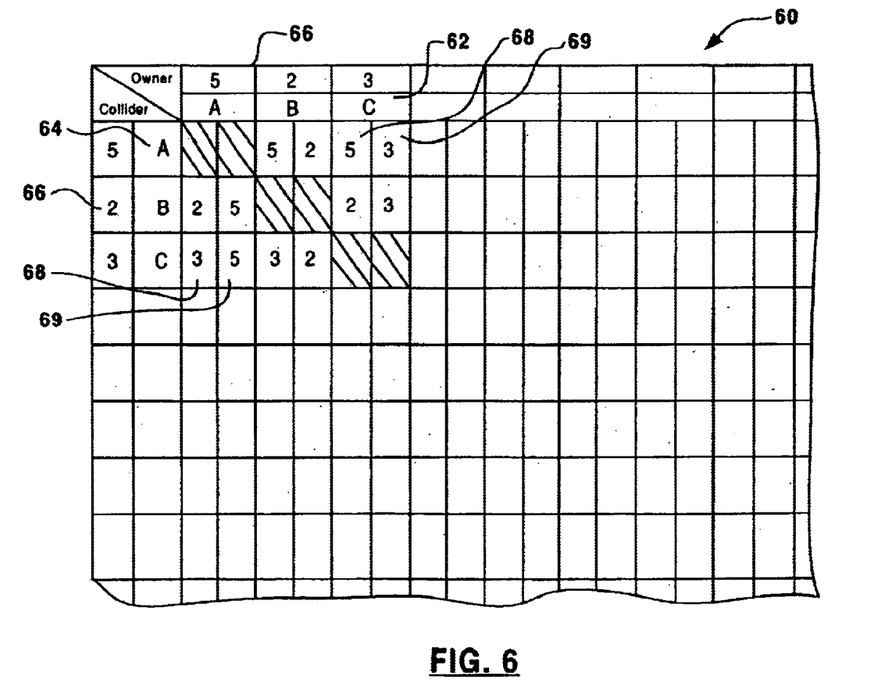
FIG. 6, which also appears on sheet two of the drawings, is a schematic diagram illustrating a class pairs priority table in accordance the second embodiment of the invention.

FIG. 6 is a schematic diagram of a class pairs priority table 60 also used by the system 10 to implement the method in accordance with the second embodiment of the invention. The class pairs priority table 60 is used in conjunction with the collision count 26 to determine which process will be rolled back when a collision occurs. The table 60 is used to track priority values associated with process class pairs. Thus, in accordance with the second embodiment of the invention, priority values are associated with process class pairs, as opposed to individual processes as described above with reference to the first embodiment of the invention. Although the table shown in FIG. 6 illustrates only three process classes (Class A, Class B and Class C), it will be understood by those skilled in the art that the table 60 includes one row and one column for each process class defined for the system 10.

As shown in FIG. 6, there is a row 62 of process class identifiers that designates an owner of a memory space when a collision occurs. Column 64 contains process class identifiers associated with a colliding process. For the sake of illustration, base priority values 66 associated with each class are shown in the table 60. The base priority values 66 need not be stored in an actual class pairs priority table 60.

As will be explained below, collisions that occur between members of the same class are treated differently than collisions that occur between members of different classes. Consequently, the class pairs priority table shown in FIG. 6 only stores a variable 68 for a collider class priority value and a variable 69 for an owner class priority value when the two classes in the pair are different. As will be explained below with reference to FIG. 7, the variable 68 that stores the collider priority value, the variable 69 that stores the owner priority value, and the collision count 26 (FIG. 5) are used to determine which process is rolled back when two processes collide.

Figure 7:
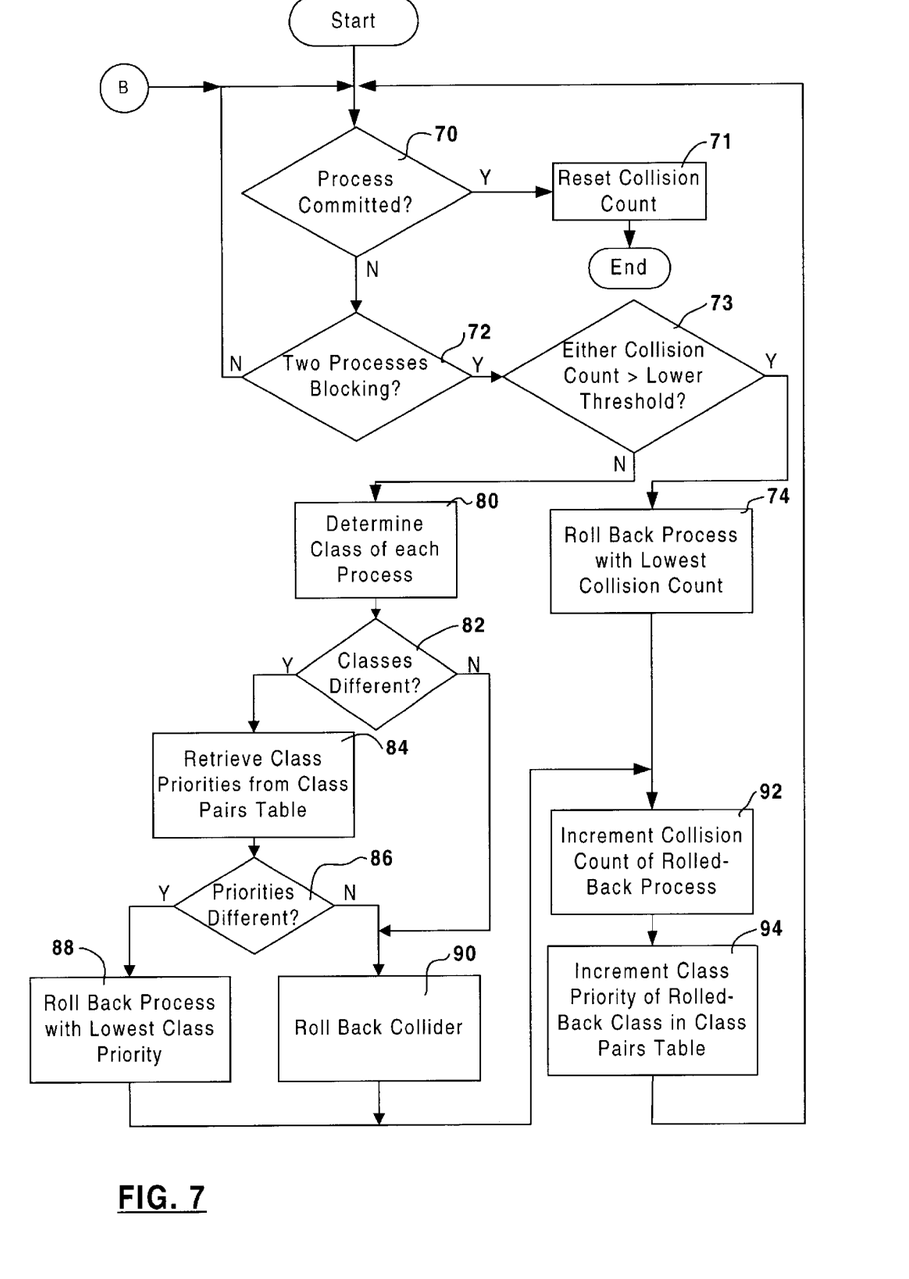
FIG. 7 is a flow diagram illustrating a method of rollback in accordance with the second embodiment of the invention.

FIG. 7 is a flow diagram that illustrates the process of rollback control in accordance with a second embodiment of the invention. In step 70 it is determined whether a process has run to a commit point. If the process has run to a commit point, the process collision count 26 (FIG. 5) in the process control block is reset (step 71) to an engineered value, zero for example. If the process has not committed, it is determined in step 72 whether two processes are blocking, as described above with reference to FIG. 3. If two processes are determined to be in a blocking condition, the respective collision counts 26 are examined to determine whether either collision count 26 exceeds a first engineered threshold (step 73). The first collision count threshold is engineered to ensure fairness in a scheduling process. If either collision count 26 exceeds the first threshold, the process with the lowest collision count is rolled back (step 74). Thereafter, the collision count of the rolled-back process is incremented in step 92, and the class priority of the class of which the rolled-back process is a member is incremented in step 94, and the process resumes at step 70.

If it is determined in step 72 that neither collision count 26 exceeds the first threshold, the class to which each of the processes belongs is determined in step 80. In step 82, the classes are compared to determine if they are different. If the classes are determined to be different, in step 84 the class priority variables 68,69 are retrieved from the class pairs table 60 (FIG. 6). In step 86, the class priority variables 68,69 are compared to determine if they are different. If the class priorities are different, the process with the lowest class priority is rolled back in step 88. If the priorities of the two classes are the same, the collider process is rolled back in step 90. In either case, the collision count of the rolled-back process is incremented in step 92. Likewise, if it is determined in step 82 that the classes are the same, the collider process is rolled back in step 90. The collision count of the rolled-back process is incremented in step 92, and the class priority of the class to which the rolled-back process is a member is incremented in step 94. Thereafter the process resumes at step 70.

Figure 8:
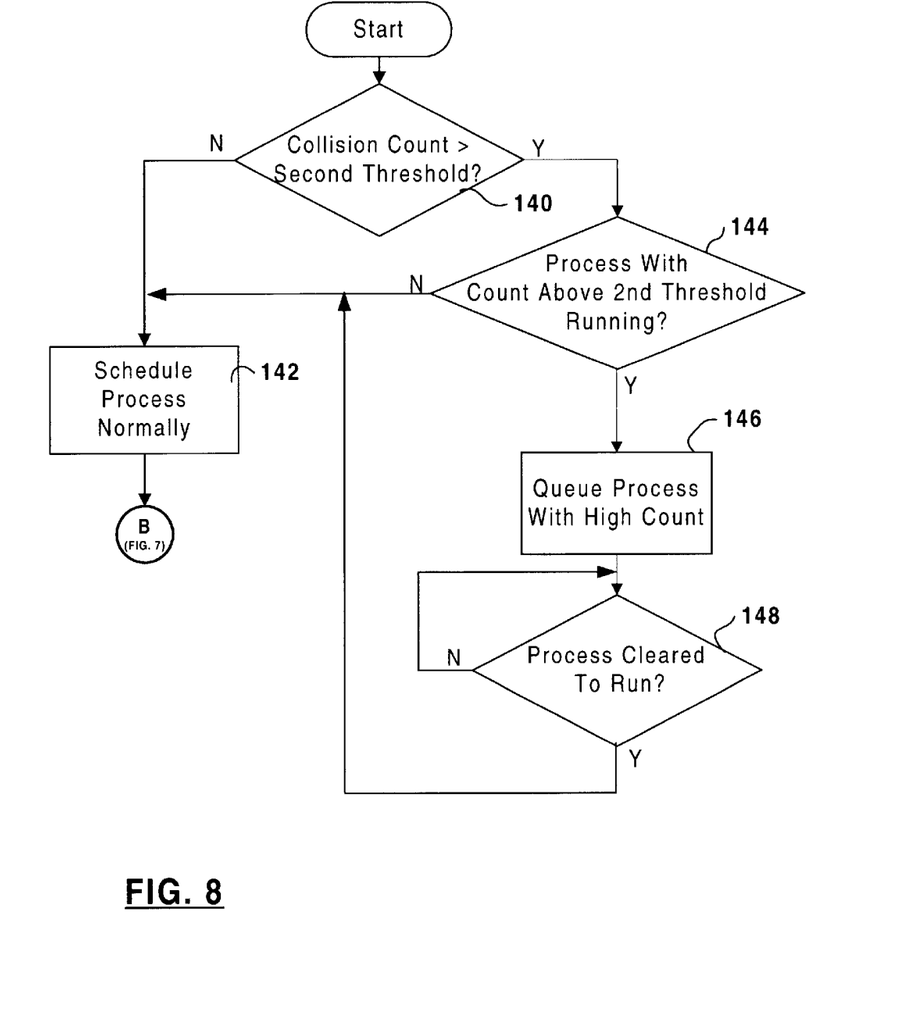
FIG. 8 is a flow diagram illustrating a method in accordance with the second embodiment of the invention for ensuring that processes that are repeatedly rolled back have an opportunity to commit.

FIG. 8 is a flow diagram illustrating a method in accordance with the second embodiment of the invention for ensuring that any particular process is not completely deprived of any opportunity to commit. In accordance with the method, whenever a process is scheduled by the scheduler (not shown) of the system 10, the collision count 26 (FIG. 5) in the process control block 22 is examined. In step 140, it is determined whether the collision count 26 associated with the process is greater than a second engineered collision count threshold, which is higher than the first collision count threshold described above with reference to FIG. 7. If the count is not greater than the second collision count threshold, the process is scheduled in the normal way (step 142) and control is passed to the beginning of the process described above with reference to FIG. 7. If the collision count 26 is greater than the second engineered collision count threshold, the collision counts of processes currently running, or already scheduled to be run, are checked in step 144. If no other process with an excessive collision count is running or scheduled to be run, the process is scheduled normally in step 142. Otherwise, the process is queued with high priority (step 146). Currently running processes and processes already scheduled to be run are then monitored in step 148 until no other process with an excessive collision count is running or scheduled to be run. Thereafter, the process is scheduled in the normal way (step 142). This ensures that the process will run to a commit point. Thus, every process which, by circumstance, is repeatedly rolled back is guaranteed an opportunity to run to a commit point after the collision count exceeds the second engineered collision count threshold.

It should be noted that the class pairs priorities stored in the class pairs priority variables 68,69 are preferably reset to engineered values after one of the variables 68,69 becomes greater than an engineered class pairs priority threshold. The size of the class pairs priority threshold is not important, because the comparison (step 86 of FIG. 7) is a relative test. A reset is preferably performed, however, to prevent the variables 68,69 from causing numeric overflow. Other methods of preventing numeric overflow of the variables can also be implemented.

Figure 9A:
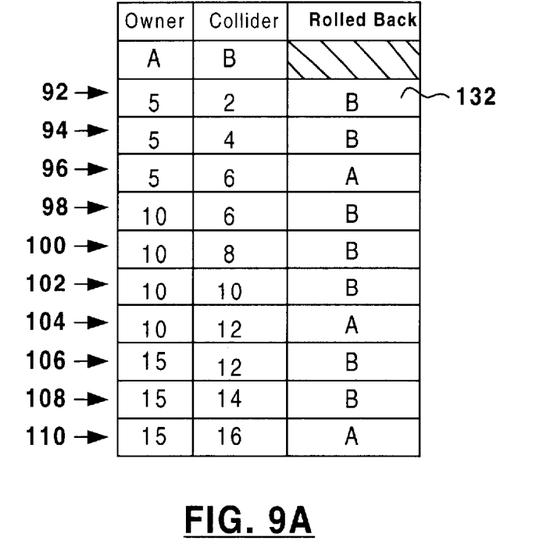
FIGS. 9A and 9B are tables illustrating process rollback in accordance with the second embodiment of the invention.
Figure 9B:
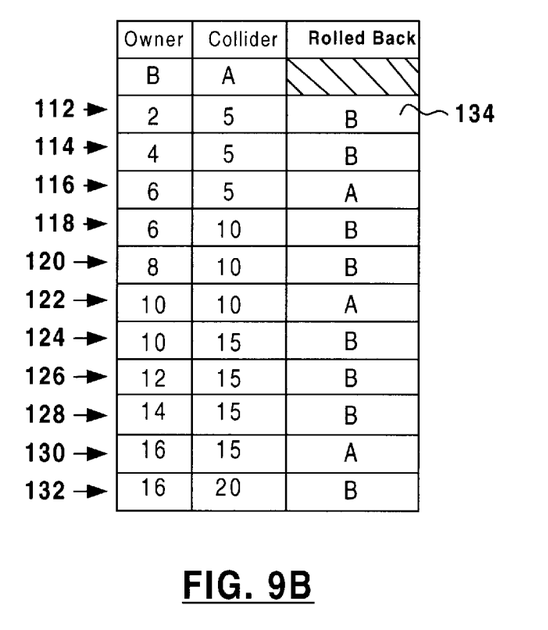

FIGS. 9A and 9B are tables that further illustrate the method in accordance with the second embodiment of the invention. As shown in FIG. 9A, the priority values associated with a class pair change as collisions occur between processes that are members of the class pair. FIG. 9A also shows the class to which the process belongs that is rolled back when a collision occurs. In the example shown in FIG. 9A, processes that are members of Class A are the owners of the memory space when the collisions occur, and processes that are members of Class B, are the colliders. As shown at row 92, each of Classes A and B are initialized to their base priority values of 5 and 2, respectively. When an initial collision occurs, the process that is a member of Class B is rolled back, as indicated at 132. When a second collision occurs (row 94) the class priority value associated with Class B has been increased to 4, which is still less than the class priority value associated with Class A. Consequently, the process that is a member of Class B is rolled back. After rollback, the priority value of Class B is incremented to 6 (row 96), and when the next collision occurs, the process that is a member of Class A is rolled back because the priority value of Class A is less than that of Class B. When the process that is a member of Class A is rolled back, the priority value of Class A is incremented by the class base and the priority value becomes 10 (row 98). When a next collision occurs, the process that is a member of Class B is therefore rolled back. The same is true for row 100 where the process that is a member of Class B is rolled back because Class B has a priority value of 8, whereas Class A has a priority value of 10. At row 102, the class priority values are equal and the process that is a member of Class B is rolled back because the process that is a member of Class A is owner of the memory space, as explained above with reference to FIG. 7. When the process of Class B is rolled back, the priority value of Class B in the class pairs priority table 60 is incremented to 12. Consequently, in row 104, when a collision occurs the process that is a member of Class A is rolled back because the priority value of Class A is less than that of Class B. In rows 106 and 108, the process that is a member of Class B is rolled back because the priority value of Class B is less than that of Class A which was incremented after the collision that occurred in row 104. However, in row 110, the priority value associated with Class B is again greater than the priority value associated with Class A, and the process that is a member of Class A is rolled back. As is apparent from a count of rollbacks in lines 92–104, process A "wins" 5 times, while B wins twice.

It should be noted that this is directly proportional to their class base priority values. Since this cycle repeats, each process class is ensured an engineered share of processor time based on class base priority.

FIG. 9B illustrates the method in accordance with the second embodiment of the invention when collisions occur in which process B is owner of the memory and process A is collider. Each of the processes belonging to Classes B and A are initialized to their inherited priority values of 2 and 5, respectively. When an initial collision occurs, the process that is a member of Class B is rolled back, as indicated at 134 of row 112. When a second collision occurs (row 114) the class pairs priority value associated with Class B has been incremented to 4. However, the process that is a member of Class B is still rolled back because its priority value is less than the process that is a member of Class A. After rollback, the priority value of Class B is incremented by its base value to 6 (row 116). Consequently, when a collision occurs with a process that is a member of Class A, the process that is the member of Class A is rolled back because the priority value of Class A is less than that of Class B. Since the process of Class A is rolled back at row 116, its priority value is incremented by the class base priority value to 10 (row 118). When a further collision occurs, the process of Class B is therefore rolled back. After rollback, the priority value of the process of Class B is increased to 8 (row 120), and when a collision occurs the process that is a member of Class B is again rolled back. The priority of Class B is therefore incremented to 10. The priority values of Classes A and B are therefore the same. When a collision occurs, the process that belongs to Class A is rolled back because the process of Class B is owner of the memory space (row 122). When the process that is a member of Class A is rolled back, the priority value of Class A is increased to 15 (row 124). Therefore, when a collision occurs, the process that belongs to Class B is rolled back. This occurs again in row 126, even though the priority value of Class B has been increased by its base priority value to 12, and once more in row 128 even though the Class B priority value has been increased to 14. At row 130, however, the priority value of Class B is increased to 16 and the process that is a member of Class A is therefore rolled back. Finally, at row 132, the priority value of Class A stands at 20, while the priority value of Class B remains 16 and the process that is a member of Class B is rolled back. As is apparent from a count of rollbacks in FIGS. 9A and 9B, the proportion of rollbacks is the same.

The patterns shown in FIGS. 9A and 9B repeat cyclically as collisions between members of the two classes occur, as is easily seen by subtracting 10 from the process priority at row 106 (FIG. 9A) and from the class priority at row 126 (FIG. 9B). As explained above with reference to FIGS. 7 and 8, if a collision count of any given process exceeds the first engineered collision threshold, that process is permitted to continue execution regardless of the priority values associated with the colliding classes in the class pairs table, provided that the process has a higher collision count 26 than the process with which it collided. Furthermore, if a particular process is rolled back enough times that its collision count 26 exceeds the second engineered threshold, then it is scheduled as the only process with that high a collision count to be permitted to execute. Thus, the process is guaranteed to win any collisions that may occur before it commits.

FIGS. 9A and 9B therefore illustrate that the method in accordance with the second embodiment of the invention also ensure that processor time in the shared memory parallel processor computing system in accordance with the invention is distributed among processes in accordance with engineered parameters. The invention therefore provides a flexible, dynamic method for process rollback in a shared memory/parallel processor computing system that ensures equitable access to computing resources by all process classes.

The embodiment(s) of the invention described above is(are) intended to be exemplary only. The scope of the invention is therefore intended to be limited solely by the scope of the appended claims.

I claim:

1. A method for process rollback in a shared-memory parallel-processor computing environment in which the parallel processors are operated concurrently and each processor sequentially runs processes, comprising steps of:
   a) when two processes compete for a memory space in the shared memory, rolling back one of:
      i) the process that has a lower priority value; and
      ii) if the two processes have the same priority value, the process that collided with an owner of the memory space; and
   b) computing a new priority value for the rolled-back process by incrementing the priority value by a predetermined amount, wherein if the two processes are members of different classes, the predetermined amount is a base priority value assigned to a class of which the rolled-back process is a member.

2. A method as claimed in claim 1 wherein if the two processes are members of the same class, the predetermined amount is less than the priority value assigned to the class.

3. A method as claimed in claim 1 further comprising a step of restoring a priority value of the process to the base priority value assigned to the class of which the process is a member each time the process runs to a commit point.

4. A method as claimed in claim 3 wherein the base priority value assigned to the class is related to a proportion of processor time allocated to the class.

5. A method as claimed in claim 4 wherein the base priority value is directly proportional to the processor time allocated to the class.

6. A method as claimed in claim 1 wherein the priority value of the process is stored in a process control block associated with the process.

7. A method as claimed in claim 1 wherein if the priority value of a process exceeds an engineered process priority threshold the process is scheduled and permitted to run without competition from another process having a same or higher priority value.

8. A method for process rollback in a shared-memory parallel-processor computing environment in which the processors run processes concurrently, and each process is a member of one of a plurality of process classes, comprising steps of:
  a) providing a pair of variables for each pair of process classes, the pair of variables respectively storing a current priority value for each process class in each process class pair; and
  b) when two processes that are members of different process classes compete for a same memory space, using the respective priority values for determining which process is rolled back.

9. The method as claimed in claim 8 wherein using the respective priority values for determining which process is rolled back further comprises a step of comparing the respective priority values and rolling back one of:
  a) the process that is a member of the class that has a lower priority value; and
  b) if the two classes have the same priority value, the process that collided with an owner of the memory space.

10. The method as claimed in claim 9 further comprising a step of storing a new priority value in the variable for the class of which the rolled-back process is a member.

11. The method as claimed in claim 10 wherein the step of storing a new priority value in the variable comprises incrementing the priority value stored in the variable by an amount equal to a base priority value allocated to the class of which the process is a member.

12. The method as claimed in claim 11 further comprising a step of providing a collision count associated with each of the processes.

13. The method as claimed in claim 12 wherein the collision count is stored in a process control block associated with each of the respective processes.

14. The method as claimed in claim 13 further comprising a step of incrementing the collision count associated with a process each time the process is rolled back.

15. The method as claimed in claim 14 wherein when two processes compete for the same memory space and a collision count associated with either process exceeds a first engineered collision threshold, the process with a lower collision count is rolled back and the process with a higher collision count is permitted to continue execution.

16. The method as claimed in claim 8 wherein when two processes that are members of the same class compete for the same memory space, the method further comprises steps of:
  a) rolling back the process that collided with an owner of the memory space; and
  b) incrementing a collision count associated with the rolled-back process.

17. The method as claimed in claim 16 further comprising steps of:
  a) comparing a value of the collision count with a second engineered collision threshold; and
  b) if the collision count exceeds the second engineered collision threshold, scheduling the process so that it will run to a commit point by scheduling the process as the only process with a collision count that is equal to, or greater than, the second engineered collision threshold.

18. The method as claimed in claim 17 further comprising a step of resetting the collision count to zero after the process runs to a commit point.

19. A shared memory parallel processor system for executing processes concurrently, comprising:
  a) means for storing a priority value associated with each process;
  b) means for determining which one of two processes is to be rolled back using the priority values associated with each of the two processes when the two processes compete for a memory space; and
  c) means for computing a new priority value for the process that is rolled back by incrementing the priority value by a predetermined amount, the predetermined amount being a first amount if the processes belong to different classes, and a second amount if the processes belong to the same class.

20. The system as claimed in claim 19 wherein the first amount is a base priority value associated with a process class to which the process belongs.

21. The system as claimed in claim 20 comprising means for allocating the base priority value in proportion to engineered parameter values.

22. The system as claimed in claim 19 wherein the means for determining which process is to be rolled back, comprises:
  a) means for selecting the process that has a lower priority value, when the two processes have different priori values; and
  b) means for selecting the process that collided with an owner of the memory space, when the two processes have the same priority value.

23. The system as claimed in claim 19 further comprising means for scheduling the process and permitting the process to run to a commit point if the priority value of the process exceeds an engineered process priority threshold.

24. The system as claimed in claim 19 further comprising means for determining a class to which each process belongs.

25. A shared-memory parallel-processor computing system in which the processors run processes concurrently, and each process is a member of one of a plurality of process classes, the apparatus comprising:
  a) means for storing a pair of variables for each pair of process classes, the variables storing a variable priority value for each process class in each process class pair; and
  b) means for determining, using the respective priority values, which process is rolled back when two processes that are members of different process classes compete for a memory space.

26. The system as claimed in claim 25 wherein the means for determining which process is rolled back selects one of:

a) the process that is a member of the class in the pair that has a lower priority value; and b) if the processes are members of a class pair that have the same priority value, the process that collided with an owner of the memory space.

27. The system as claimed in claim 26 further comprising means for storing a new priority value in the variable for the class of the class pair of which the rolled-back process is a member.

28. The system as claimed in claim 27 wherein the means for storing a new priority value in the variable adds, to the value of the variable, an amount equal to a base priority value.

29. The system as claimed in claim 28 further comprising means for computing and storing a collision count associated with each of the processes.

30. The system as claimed in claim 29 further comprising means for storing a first collision count threshold and a second collision count threshold.

31. The system as claimed in claim 29 wherein the means for computing and storing the collision count stores the collision count in a process control block associated with each of the respective processes.

32. The system as claimed in claim 31 wherein the system increments the collision count associated with the rolled-back process.

33. The system as claimed in claim 32 further comprising means for rolling back a process with a lower collision count when two processes compete for a memory space and the collision count of either process exceeds the first collision count threshold.

34. The system as claimed in claim 29 wherein the system resets the collision count to zero when a process has run to a commit point.

35. The system as claimed in claim 33 wherein when two processes that are members of the same class compete for a memory space, the apparatus rolls back the process that collided with an owner of the memory space, and increments the collision count associated with the rolled back process.

36. The system as claimed in claim 35 further comprising means for comparing a value of the collision count with the second engineered collision threshold, and if the collision count exceeds the second engineered collision threshold, scheduling the process to run without competition.

37. The system as claimed in claim 36 wherein the system schedules the process to run to a commit point by scheduling the process so that it does not run concurrently with another process having a collision count that is equal to, or greater than, the second engineered collision threshold.

* * * * *